US012561133B2

(12) United States Patent
Gill et al.

(10) Patent No.:  US 12,561,133 B2
(45) Date of Patent:      Feb. 24, 2026

(54) CODING INTERACTIVELY WITHOUT HAVING TO RESTART A PROCEDURE

(71) Applicant: Kognitos, Inc., San Jose, CA (US)

(72) Inventors: Binny Sher Gill, San Jose, CA (US);
Aaron Dean Brown, Wausau, WI (US);
Ziv Kennan, Berkeley, CA (US)

(73) Assignee: Kognitos, Inc., San Jose, CA (US)

( * ) Notice:     Subject to any disclaimer, the term of this patent is extended or adjusted under 35 U.S.C. 154(b) by 185 days.

(21) Appl. No.: 18/318,638

(22) Filed:      May 16, 2023

(65)                Prior Publication Data

US 2023/0376309 A1      Nov. 23, 2023

Related U.S. Application Data

(60) Provisional application No. 63/364,880, filed on May 17, 2022.

(51) Int. Cl.
*G06F 8/72*          (2018.01)
*G06F 8/36*          (2018.01)
*G06F 8/71*          (2018.01)

(52) U.S. Cl.
CPC ................. *G06F 8/72* (2013.01); *G06F 8/36* (2013.01); *G06F 8/71* (2013.01)

(58) Field of Classification Search
None
See application file for complete search history.

(56)                References Cited

U.S. PATENT DOCUMENTS 6,314,559 B1     11/2001  Sollich
8,271,955 B1 *    9/2012  Lindahl ............... G06F 11/3636
                                                          714/45

9,063,742 B1 *    6/2015  Bienkowski .............. G06F 8/71
9,372,846 B1      6/2016  Perkov
11,113,186 B1     9/2021  Hussain et al.
11,791,037 B1    10/2023  Shrum et al.
2010/0162204 A1 *  6/2010  Baumann .................. G06F 8/71
                                                          717/106
2013/0097431 A1 *  4/2013  Hriljac ..................... G06F 8/52
                                                          713/189
2014/0089265 A1 *  3/2014  Talagala .................. G06F 16/22
                                                          707/674
2017/0329582 A1   11/2017  Steven et al.
                          (Continued)

FOREIGN PATENT DOCUMENTS

CN          111480348        7/2020
KR        20160099575        8/2016
                        (Continued)

OTHER PUBLICATIONS

Zhao, "Supporting Process Undo and Redo in Software Engineering Decision Making", 2013, ACM (Year: 2013).*
                        (Continued)

*Primary Examiner* — Hossain M Morshed

(74) *Attorney, Agent, or Firm* — Vista IP Law Group, LLP

(57)                ABSTRACT

Disclosed is an improved approach to implement software programming which allows for interactive coding without having to restart a procedure. This is implemented using a combination of an interpreter which allows for modification of code during runtime using an interactive console and a versioned memory system used by the interpreter to roll-back memory to a previous state of execution.

24 Claims, 17 Drawing Sheets

(56) References Cited

U.S. PATENT DOCUMENTS

| | | | |
|---|---|---|---|
| 2017/0332295 A1 | 11/2017 | Sunay | |
| 2018/0084338 A1 | 3/2018 | Bostick et al. | |
| 2020/0111012 A1* | 4/2020 | Wan | G06F 40/30 |
| 2020/0151644 A1* | 5/2020 | Braham | G06Q 10/06316 |
| 2022/0156466 A1* | 5/2022 | Gill | G06N 5/022 |
| 2023/0297448 A1 | 9/2023 | Doerr et al. | |
| 2024/0046318 A1 | 2/2024 | Muriqi | |
| 2025/0139388 A1* | 5/2025 | Agrawal | G06F 40/40 |

FOREIGN PATENT DOCUMENTS

| | | |
|---|---|---|
| TW | 581977 | 4/2004 |
| WO | WO-2018038385 | 3/2018 |
| WO | WO-2024021952 | 2/2024 |

OTHER PUBLICATIONS

Yampolskiy, R., "Analysis of Types of Self-Improving Software," Computer Engineering and Computer Science Speed School of Engineering University of Louisville, USA, dated May 15, 2016.

Gulwani, S., et al., "NLyze: Interactive Programming by Natural Language for SpreadSheet Data Analysis and Manipulation," Proceedings of the 2014 ACM SIGMOD International Conference on Management of Data, Published Jun. 18, 2014.

Becker, K., "Using Artificial Intelligence to Write Self-Modifying/Improving Programs," Primary Objects, dated Jan. 27, 2013.

Reynolds, M., "AI learns to write its own code by stealing from other programs," dated Feb. 22, 2017, URL: https://www.newscientist.com/article/mg23331144-500-ai-learns-to-write-its-own-code-by-stealing-from-other-programs/#ixzz7Owg99tWM.

"Translating Natural Language to Code," transifex, dated Apr. 1, 2013, URL: https://www.transifex.com/blog/2013/translate-natural-language-to-code/.

Wiggers, K., "OpenAI launches Codex, an API for translating natural language into code," The Machine, dated Aug. 10, 2021.

Rahit, K., et al., "Machine Translation from Natural Language to Code using Long-Short Term Memory," dated Oct. 2019.

Lardinois, F., "Microsoft uses GPT-3 to let you code in natural language," TechCrunch, dated May 25, 2021.

Liu, X., et al., "From Natural Language to Programming Language," IGI Global, copyright 2018.

Clarke, L., et al., "Continuous Self-Evaluation for the Self-Improvement of Software," University of Massachusetts, date found via Google as Jul. 13, 2021.

Nair, H., "Building Alexa skills in Python, for absolute beginners," chatbotslife, dated Mar. 9, 2019.

Gonfalonieri, A. "How Amazon Alexa works? Your guide to Natural Language Processing (AI)," Towards Data Science, dated Nov. 21, 2018.

Young, J., "Amazon Echo: Create a Custom Voice Command," Smart Home Focus, dated Nov. 12, 2020.

A.Arusoaie and D. I. Vicol, "Automating Abstract Syntax Tree Construction for Context Free Grammars," 2012 14th International u Symposium on Symbolic and Numeric Algorithms for Scientific Computing, Timisoara, Romania, 2012, pp. 152-159, doi: 10.1109/SYNASC.2012.8. (Year: 2012).

G. Fischer, J. Lusiardi and J. Wolff von Gudenberg, "Abstract Syntax Trees—and their Role in Model Driven Software Development, V" International Conference on Software Engineering Advances (ICSEA 2007), Cap Esterel, France, 2007, pp. 38-38, doi: 10.1109/ICSEA.2007.12. (Year: 2007).

Non-Final Office Action dated Nov. 16, 2023 for U.S. Appl. No. 17/452,047.

Notice of Allowance dated Aug. 12, 2025 for U.S. Appl. No. 18/649,946.

Notice of Allowance dated Mar. 19, 2024, for U.S. Appl. No. 17/452,047.

Notice of Allowance dated Apr. 30, 2025 for U.S. Appl. No. 18/649,946.

P, Pannuto, W. Wang, P. Dutta and B. Campbell, ""A Modular and Adaptive Architecture for Building Applications with Connected Devices,"" 2018 IEEE International Conference on Industrial Internet (ICII), Seattle, WA, USA, 2018, pp. 1-12, doi: 10.1109/ICII.

Notice of Allowance dated Jan. 13, 2026, for U.S. Appl. No. 18/649,946.

* cited by examiner

600
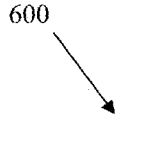
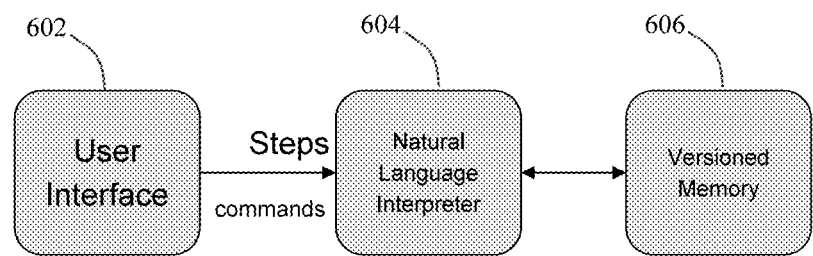
System Architecture
Fig. 6

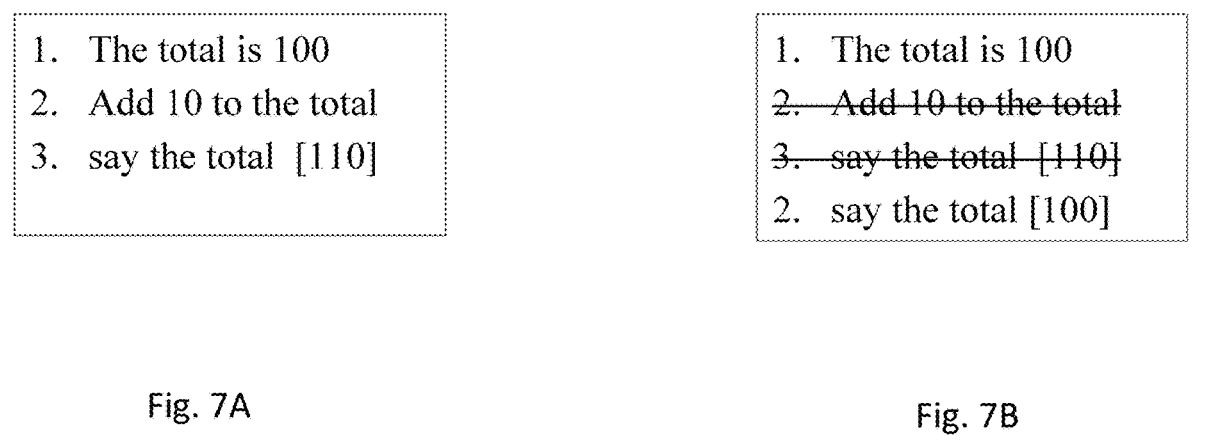

1.   The total is 100
2.   Add 10 to the total
3.   say the total  [110]

Fig. 7A

1.   The total is 100
2.   ~~Add 10 to the total~~
3.   ~~say the total [110]~~
2.   say the total [100]

Fig. 7B

Receive the name to lookup
902

Lookup the vertex chain corresponding
to the name in Memory
904

Traverse the chain until we reach the
first valid (unscratched) vertex for the
name that is older or equal to the
particular time
906

Return the vertex's value
908

User inputs a new step in the procedure 1002

The interpreter parses the command and looks up value for some names from Memory 1004

The values are used to process the step 1006

The interpreter generates new values for some names and updates those in Memory 1008

The step keeps a list of names that were updated in Memory 1010

The timeframe of the step's execution is stored in the step 1012

1400

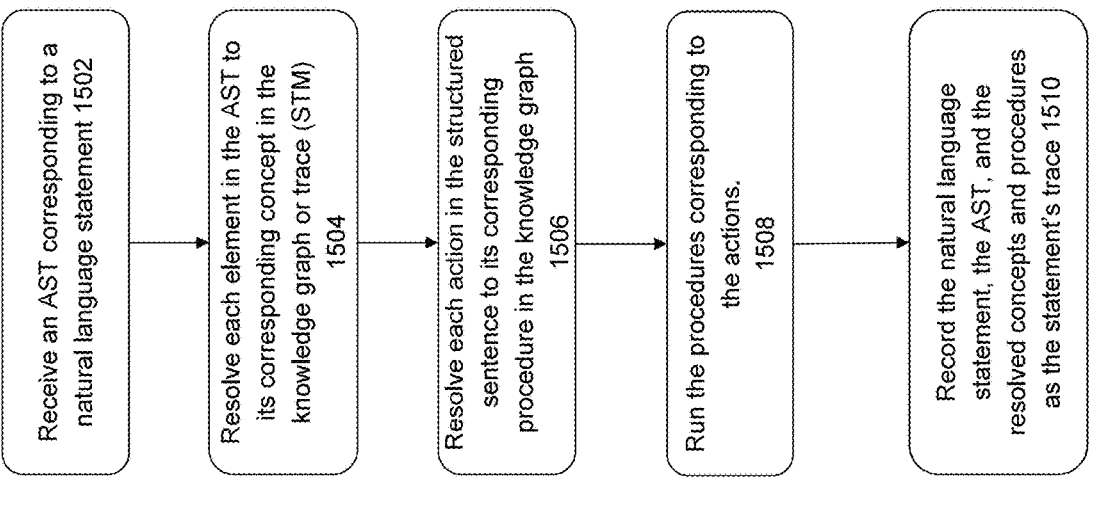

Receive an AST corresponding to a natural language statement 1502

Resolve each element in the AST to its corresponding concept in the knowledge graph or trace (STM) 1504

Resolve each action in the structured sentence to its corresponding procedure in the knowledge graph 1506

Run the procedures corresponding to the actions. 1508

Record the natural language statement, the AST, and the resolved concepts and procedures as the statement's trace 1510

Fig. 15

CODING INTERACTIVELY WITHOUT HAVING TO RESTART A PROCEDURE

CROSS-REFERENCE TO RELATED APPLICATIONS

The present application claims the benefit of priority to U.S. Provisional Application No. 63/364,880, filed on May 17, 2022, which is hereby incorporated by reference in its entirety.

BACKGROUND

Software programming involves the process of identifying desired behavior from a computer system, and generating computer code to functionally cause the computer system to implement the desired behavior. This is normally done using a specialized programming language (a "native" language) such as Java or C is used to "code" specific behaviors into a computer system. This may also be done through natural language processing (NLP), which permits a computing system to understand and/or act upon inputs, whether spoken or text, which are provided in a language that humans would typically use to interact with another human.

Software development is typically considered to be a difficult endeavor that requires a significant amount of skill and training to correctly implement a product from the development process. This is often due in great part to the fact that the developer is forced to write code in an abstract setting. The code has variables that represent values that will be received during the execution of the program. However, it is much simpler to write code while interacting with an example. That is the reason why data scientists use Notebooks to experiment with multiple variations of code quickly (e.g., Jupyter notebooks in Python).

The issues addressed by this disclosure is that conventional approaches to implement procedures in software code suffer from significant limitations. To explain, consider if a procedure has four steps, and all of them have been executed. Now, after examining the result of the fourth step, the user realizes that the second and fourth steps need to be changed. Current systems cannot undo the changes in the computer memory that were caused by the second and fourth steps. The user is forced to change the steps and restart all the steps from the beginning.

What is needed, therefore, is an improved technological approach that overcomes some or all of the problems described above with regards to software development and programming.

SUMMARY

Some embodiments of the invention are directed to an improved approach to implement software programming which allows for interactive coding without having to restart a procedure. Some embodiments pertain to any combination of the above-described or any herein described elements and/or any other element or concept described in this document or attached figures.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 5A and 5B show a different example where steps were executed sequentially and the user is able to examine the intermediate values computed by the system.

FIG. 6 shows a system 600 to implement some embodiments of the invention.

FIGS. 7A and 7B illustrate certain step sequences according to some embodiments of the invention.

FIG. 15 shows a flowchart of an approach to process natural language according to some embodiments of the invention.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Some embodiments of the invention are directed to an improved approach to implement software programming which allows for interactive coding without having to restart a procedure.

Recall the hypothetical scenario where a procedure has four steps, and all of them have been executed. After examining the result of the fourth step, the user realizes that the second and fourth steps need to be changed. Conventional systems cannot undo the changes in the computer memory that were caused by the second and fourth steps, and thus the user is forced to change the steps and restart all the steps from the beginning.

In some embodiments, this scenario is addressed whereby the computer can be instructed to forget that it ran the second and fourth steps (and/or forget the changes caused by them in the computer memory), and then the system is brought to the state where it has only to run the first and third steps. Thereafter, the user can just simply add in the new steps that the system can now execute.

FIGS. 1-4 provide an illustration of such a workflow according to some embodiments of the invention. In the illustrative interface 102 of FIG. 1, it can be seen that the user started with a "do nothing" command. This is optional command, but highlights the ability of the system to do something that is a placeholder until the user can instruct with the real commands. The user adds the "john is an employee" command and the system registers that in its knowledge base and returns an "OK" as a result.

Figure 1:
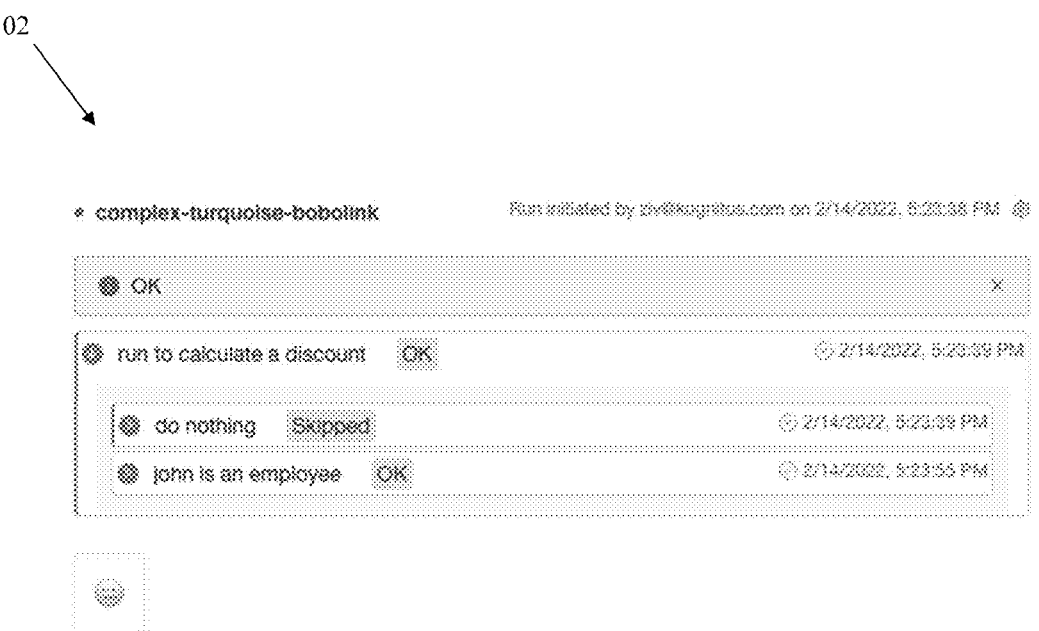
FIGS. 1-4 provide an illustration of such a workflow according to some embodiments of the invention.
Figure 2:
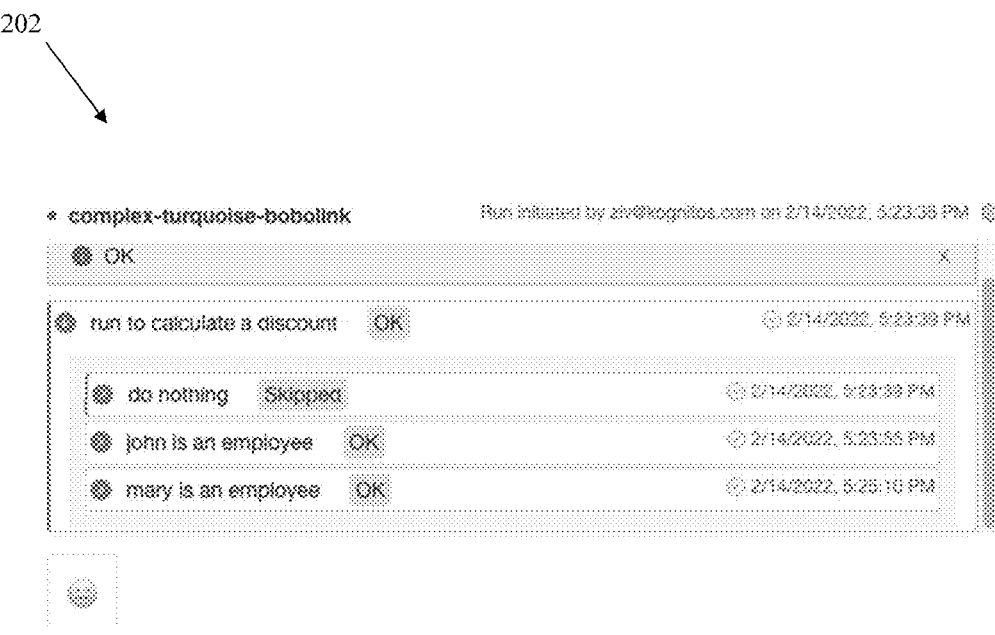

In the interface 202 of FIG. 2, the user teaches the system about "Mary". In particular, the user has added the "mary is an employee" command. The system registers that in its knowledge base and returns an "OK" as a result. In the interface 302 of FIG. 3, the user asks the system to provide a list of "the above employees". The system responds with a list including John and Mary as expected.

Figure 4:
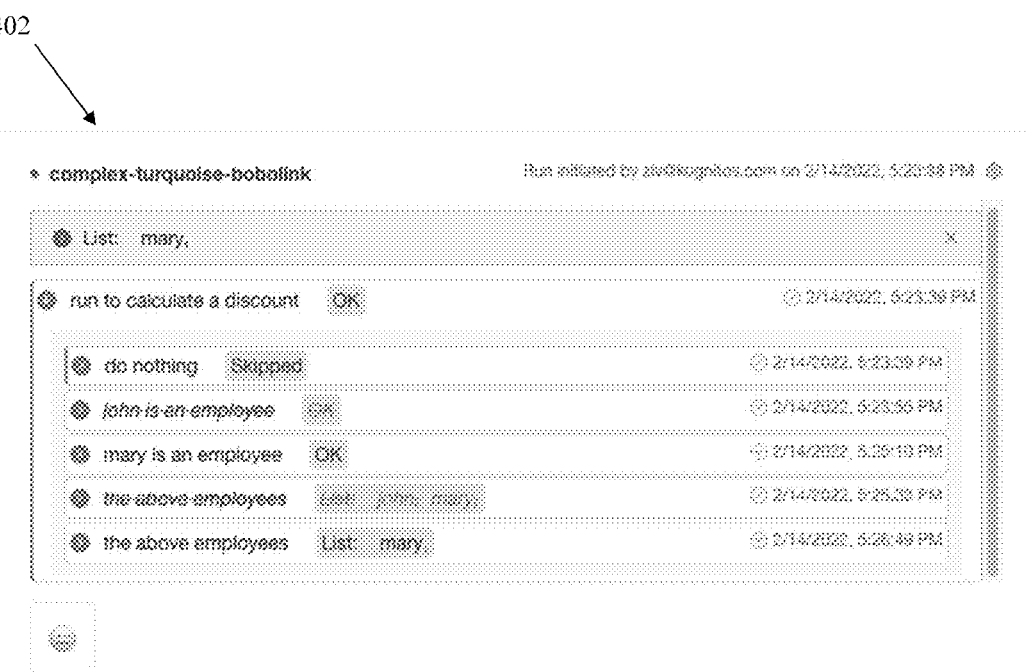

In the interface 402 of FIG. 4, the user changes his/her mind and scratches off john from the list and the unwanted answer in the fourth step. The user then asks the system to provide again a list of "the above employees" at this point. The system responds with only Mary (and does not identify John). This happens because the system ignores all information generated by the scratched lines in computing the values for the new commands.

Figure 5A:
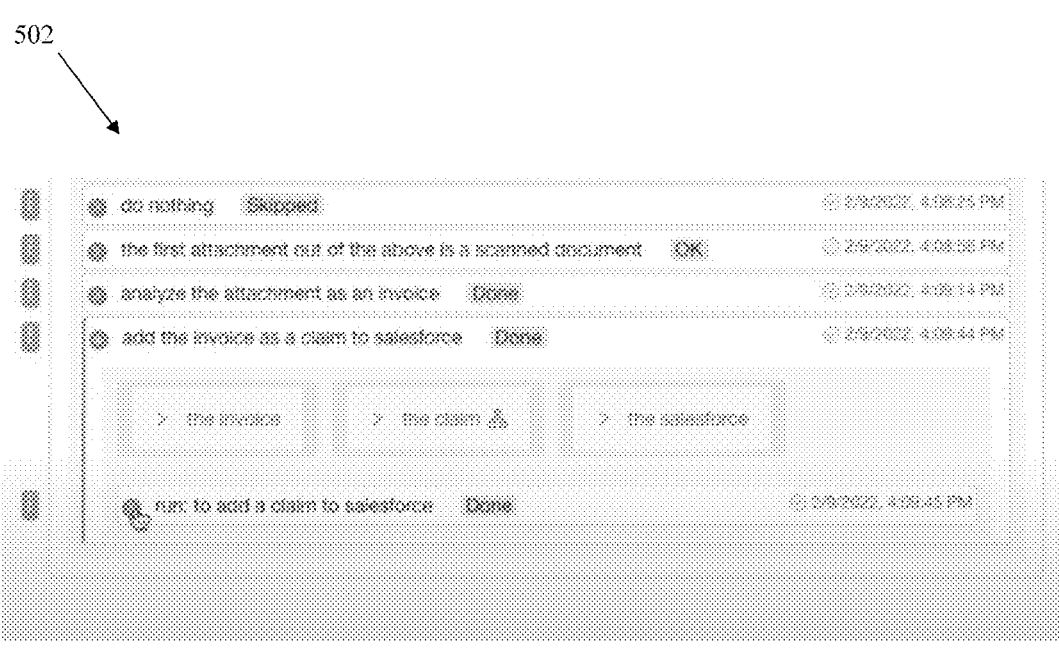

FIGS. 5A and 5B show a different example where steps were executed sequentially and the user is able to examine the intermediate values computed by the system. The interface 502 of FIG. 5A shows that in response to the "add an invoice as a claim to salesforce", the system computed three local values, (i) the invoice, (ii) the claim, and, (iii) the salesforce. The interface 504 of FIG. 5B shows the details of the claim when the user clicks on the concepts. If the user is dissatisfied with the results, the user can scratch the command and try a different command.

A special case of scratching and adding a new step is to retry a step (which is essentially scratching and adding back the same command).

This kind of system allows a very powerful software development model where a user is working with a real example and exploring what code will work without the need to ever restart the program from the beginning. Today, most computer programming relies on restarting execution from the beginning if any execution state needs to be reversed. Interactive notebooks are no different.

Once the user has experimented with the commands needed to process the inputs and created the desired outputs, the user can then publish the working set of steps as code for the procedure. Effectively, the code is developed with a single run of the procedure. This dramatically reduces development time and makes programming easier as it is an example-driven programming paradigm.

FIG. 6 shows a system 600 to implement some embodiments of the invention. This figure describes a system architecture showing components and their relationships to each other. There are several pieces used to build such a system. The system includes an interpreter 604 and a versioned memory system 606. The interpreter 604 receives commands/steps from a user interface 602. Operationally, the interpreter 604 allows for modification of code during runtime using an interactive console. The versioned memory system 606 is used by the interpreter to roll-back memory to a previous state of execution.

With regards to an interpreter with an interactive console, it is noted that most interactive interpreters allow addition of new instructions, but cannot allow cancellation of already executed instructions. However, embodiments of the invention provide for this functionality. To implement this, the system provides a UI to show a listing of the commands executed by the system so far. The user can look at the results of each step and then decide whether to keep the steps or "scratch" them off. The user can choose to scratch off any set of lines from the execution state of the interpreter using the user interface. The interpreter will ignore the versions of the values created by those steps that were scratched.

For example, consider the following sequence of steps as shown in FIG. 7A: (a) The total is 100; (b) Add 10 to the total; (c) say the total [110]. In this case, the interpreter will print "110" as the answer of the third step.

Figure 8:
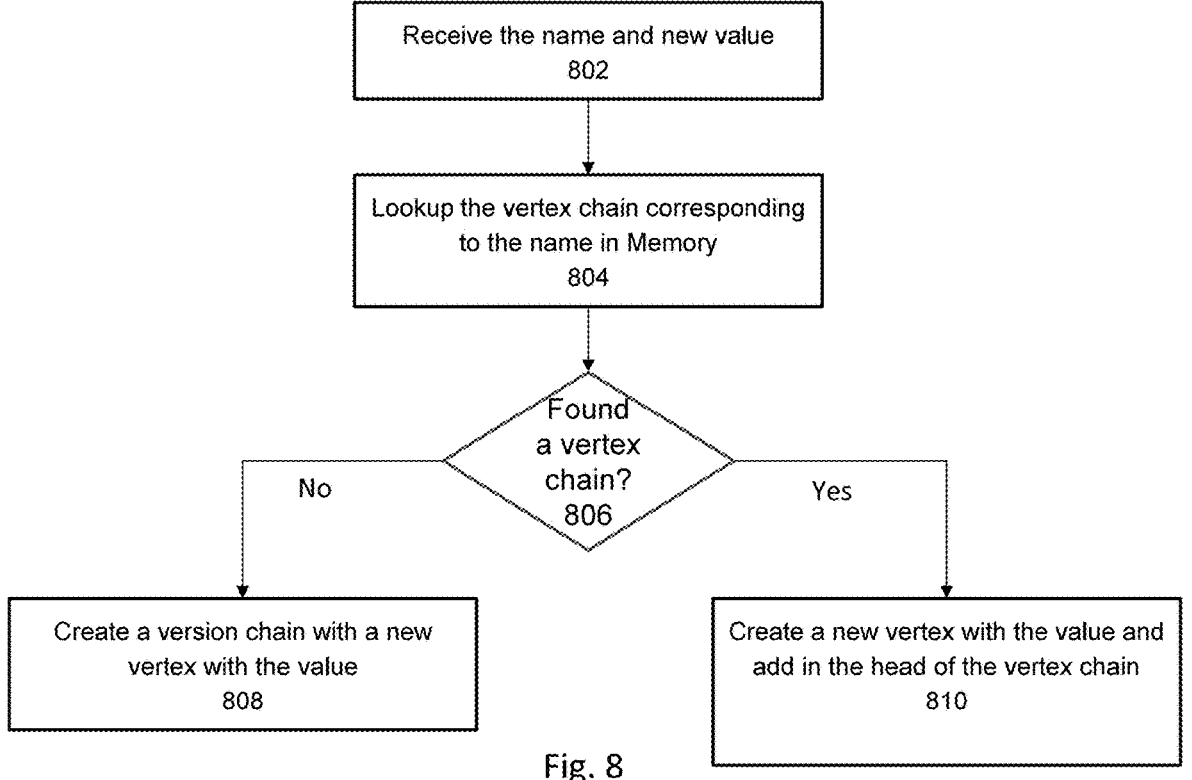
FIG. 8 shows an approach to create/update the value for a name in versioned memory.

Now, if the user scratches off the second and third steps, and then inserts "say the total" as the second line, then the interpreter will print "100" even though it earlier updated "the total" to 110. As illustrated in FIG. 7B, the flow will show step 1, scratched out for steps 2 and 3, and then show the new step 2. Once the user is happy with the results, the user can export the statements that are not scratched as the final steps in the procedure FIG. 8 shows an approach to create/update the value for a name in versioned memory. The value for a name and updates to it can be maintained as a list in temporal order called a version chain. At 802, the process receives the name and new value associated with it. Next, at 804, the process looks up the vertex chain corresponding to the name in memory. If this is the first time the name is referenced no version chain will be found for the name (at 806), and at 808, the process will create a new vertex with the value and a new vertex chain with the new vertex in it. If a vertex chain is found, then at 810, the process will then create a new vertex with the value and add in the head of the vertex chain.

Figure 9:
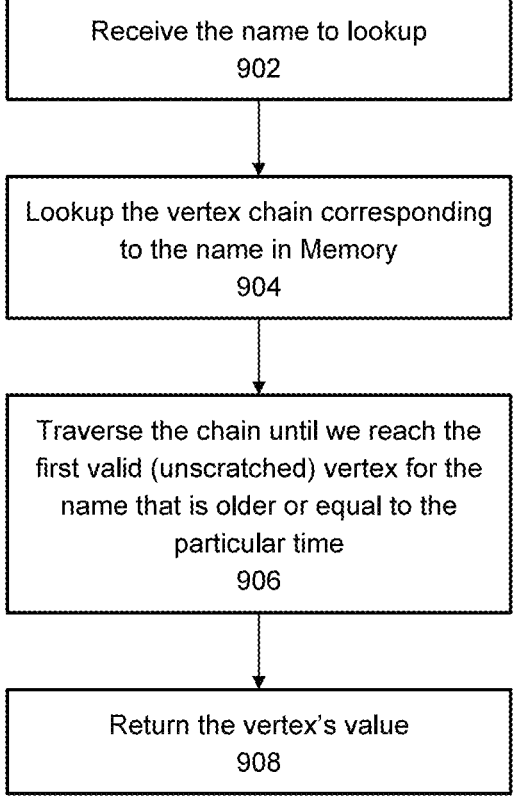
FIG. 9 describes an approach to lookup a name's value as of a particular time in the versioned memory.

FIG. 9 describes an approach to lookup a name's value as of a particular time in the versioned memory. At 902, the process started by receiving a name to look up. Next, at 904, a lookup is performed for the vertex chain corresponding to the name in memory. At 906, the process will then traverse the chain until reaching the first valid vertex for the name that is older than or equal to the particular time. The lookup can be performed efficiently using an index or a temporal database. Thereafter, at 908, the vertex's value will then be returned.

With regards to a versioned memory system, disclosed are approaches to implement a natural language auto procedure builder. The disclosure also describes how a step is added, how a step is scratched, and how the versioned memory is looked up in response to a step being run (where 0 or more previous steps are scratched).

Figure 10:
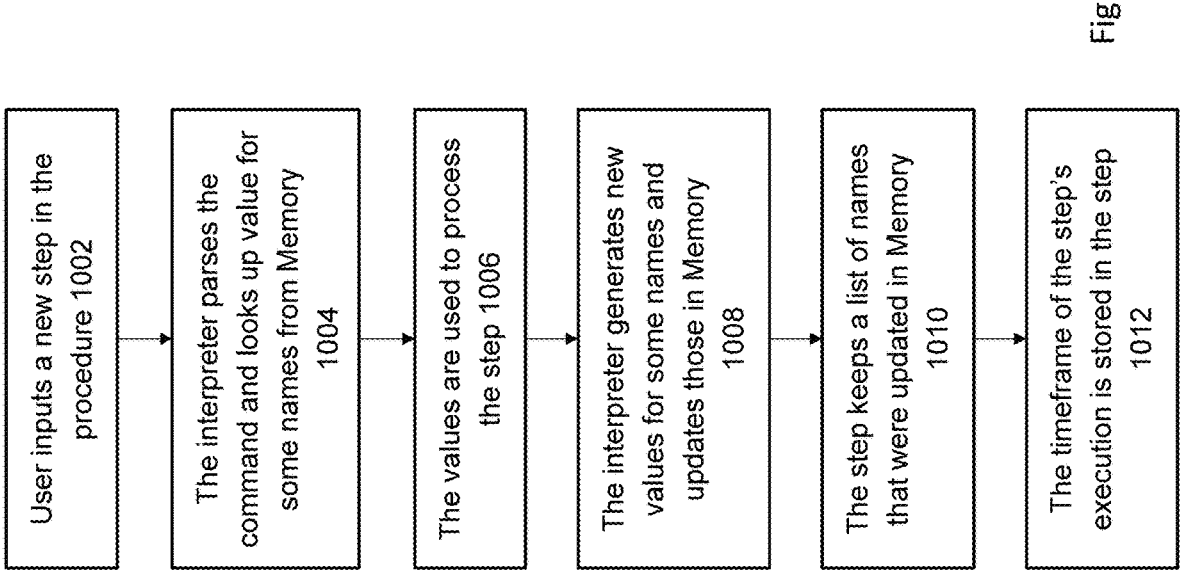
FIG. 10 shows an approach to add and process a new step.

FIG. 10 shows an approach to add and process a new step. At 1002, the user inputs a new step in the procedure. Next, at 1004, the interpreter parses the command and looks up values of the names referred to by the step, in the memory.

At 1006, the values are used to process the step. The interpreter at 1008 then generates new values for some names and updates those in memory. At 1010, the system keeps a list of names that were updated in memory. Thereafter, at 1012, the timeframe of the step's execution is stored in the step.

Figure 11:
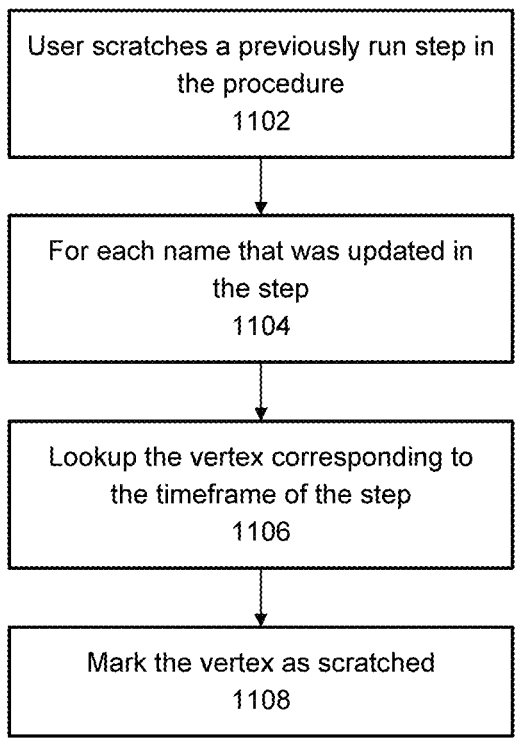
FIG. 11 shows an approach to scratch a previously run step.

FIG. 11 shows an approach to scratch a previously run step. In step 1102, the user scratches a previously run step in the procedure. The process then performs steps 1106 and 1108 for each name associated with the step that was updated. At 1106, a lookup is performed in the vertex chain associated with the name for the vertex corresponding to the timeframe of the step. The process then marks the vertex as scratched at 1108.

In some embodiments, information is of two types: (i) Global and (ii) Local. Global information is kept in a knowledge graph as a vertex. Each vertex keeps a historical record of all values that the concept it represents ever had. Along with the list of values, it also maintains the context and step at which the value was updated.

Any time during the execution of a step a vertex's value is needed (like 'the total' in the previous example), the latest value of the vertex is preferred, unless the value was written in a step that has since been scratched out. In which case, the previous value is looked up until a value that was created in a step that is not yet scratched is reached. If all the values are scratched, then the value is assumed to be undefined.

Figure 3:
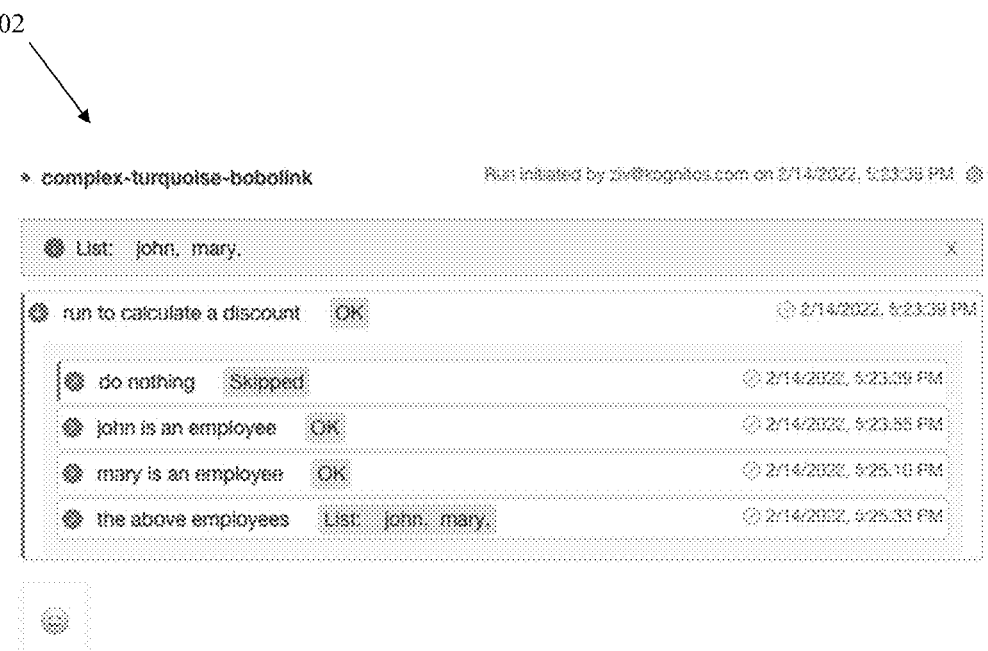

Local information is kept with the record of each step that is run as part of executing the procedure. When a step is scratched, all the local information generated by that step is also scratched. As can be seen in FIG. 4, "the above employees" yields only Mark and not John and Mary because the line that generated "John" as a local concept was scratched out. In FIG. 3, "the above employees" yielded both John and Mary because none of the steps were scratched out.

Figure 12:
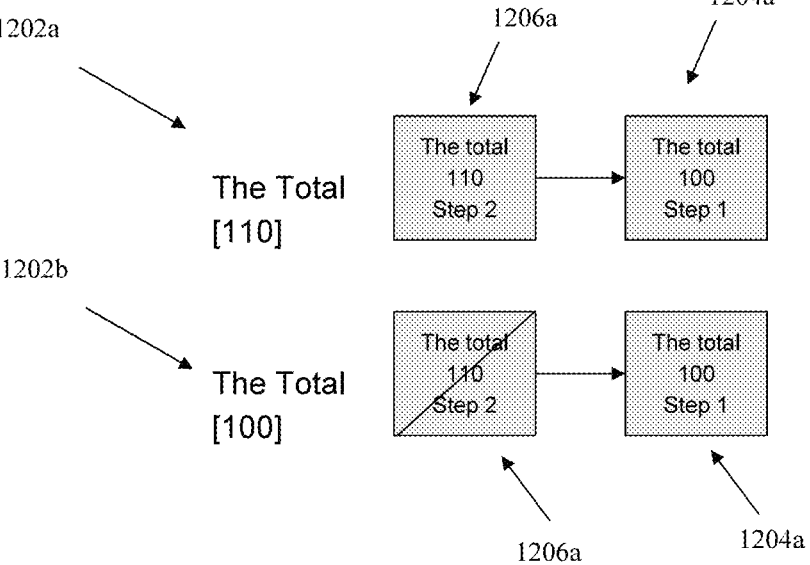
FIG. 12 shows an example of the evolution of the vertex chain when a named vertex's value gets scratched.

FIG. 12 shows an example of the evolution of the vertex chain when a named vertex's value gets scratched. Here, the vertex chain evolution is shown corresponding to the changes that were shown for FIGS. 7A and 7B. In particular, vertex chain 1202*a* includes a vertex 1204*a* and 1206*a*. Vertex 1204*a* corresponds to the step in FIG. 7A where the total is "100" and vertex 1206*a* corresponds to the step where the total is "110". In the transition to FIG. 7B from 7A, the step to add "1" was scratched out. As a result, the revised vertex chain 1202*b* has evolved such that revised vertex chain 1202*b* only includes a vertex 1204*b*, but does not include 1206*b*.

In alternative embodiment, an approach can be provided whereby the system maintains a versioned memory which has better performance as follows. The versioned memory maintains a chain of vertices as above. Any time a vertex is scratched, the system makes sure that there is a more recent version of the name's value that is valid. If scratching off the most recent version of the name's value, then the system traverses the chain of vertices and copy over the most recent valid vertex to the head of the chain. That way the lookup for the name's current value will always find the most recent value at the head of the chain of vertices, and there is no need to traverse the chain during lookups. The traversal is only needed during the scratching of vertices.

Illustrative Natural Language Programming Architecture

Embodiments of the present invention may be usefully employed in the context of any programming paradigm. As just one example, the inventive concepts may be used in the context of a natural language programming system.

Natural language processing (NLP) refers to a field in computer science that permits a computing system to understand and/or act upon inputs, whether spoken or text, which are provided in a language that humans would typically use to interact with another human. This is in contrast to non-natural language processing approaches where, for example, a specialized programming language (a "native" language) such as Java or C is used to "code" specific behaviors into a computer system.

One drawback with many conventional systems is that any desired function or skill sought by a user can only be performed if the requested function or behavior has already been programmed into the system. Any requested function or behavior not already programmed into the system will not work or be understood by the system.

When it becomes known that the system cannot process a desired function or skill, a not-insignificant amount of effort is needed to then program the desired behavior into the known systems. To build a new function into the known systems, a programmer is typically needed to develop the new functionality using a programming language. For example, a new skill in conventional natural language processing systems is typically constructed using a traditional programming language like Java or Python. Non-programmer approaches may also be used to construct new functionality, where there are tools that can be used by non-programmers to change and program new computer behaviors, e.g., where such tools may be referred to as low code/no code tools. Much of the time, these tools are delivered in the form of a drag-drop console where widgets that process data or exhibit behavior are joined together in a flow-chart creating a visual representation of the workflow. However, these approaches all still require a human user to engage in some form of manual effort to create and "program" new behaviors into the system, and the success or failure of the new behavior is entirely reliant upon the experience, knowledge, and design skills of the human user. In many cases, the high learning curve and experience needed for a human to become proficient enough to think about all the corner cases in an up-front manner makes it difficult if not impossible for most individuals to be able to create error-free and fully functional programming for a processing system, whether by writing software or using non-programmer tools.

Figure 13:
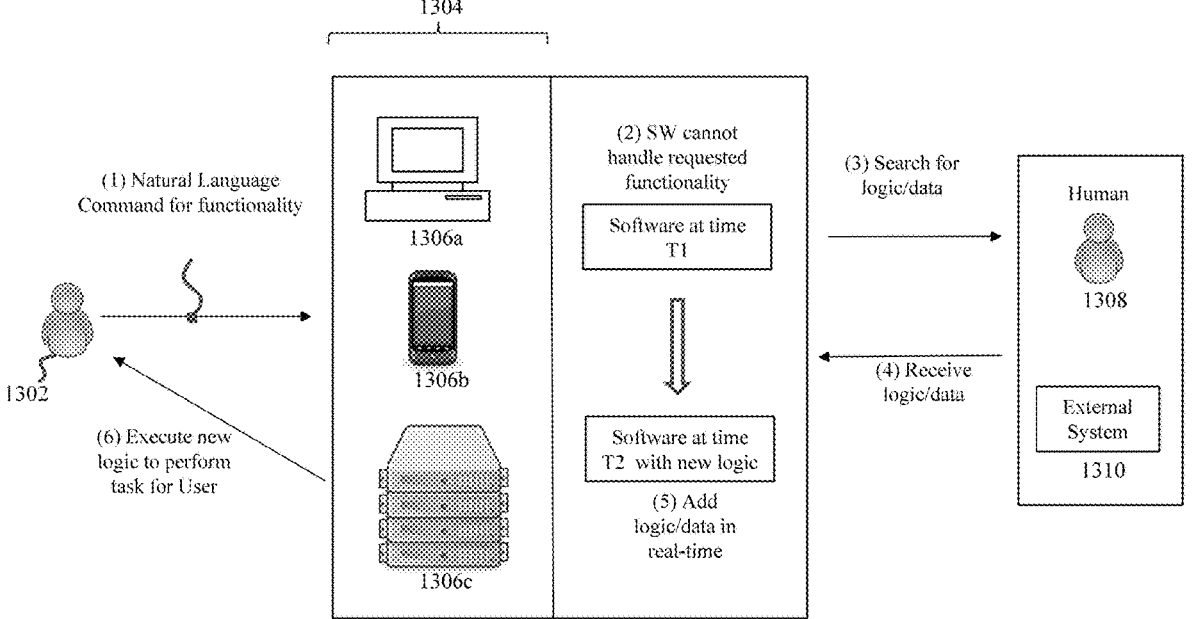
FIG. 13 provides a high-level illustration of an approach to implement a natural language programming architecture according to some embodiments of the invention.
Figure 14:
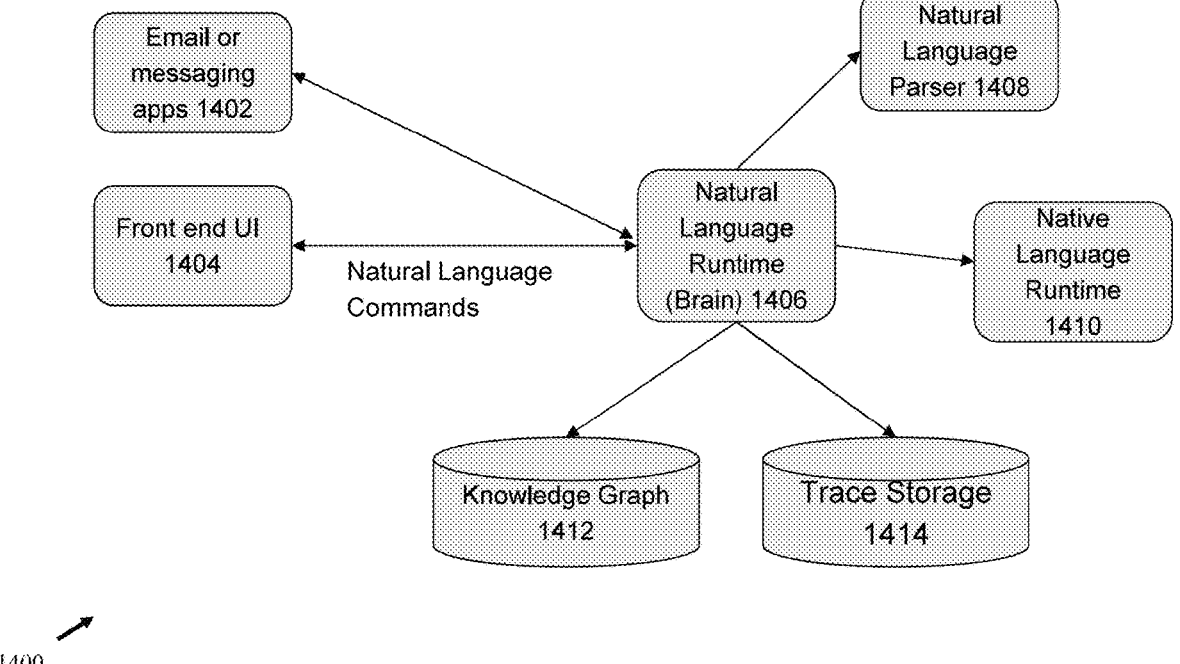
FIG. 14 provides an illustration of a system architecture for implementing a natural language programming approach according to some embodiments of the invention.

Therefore, a natural language programming approach may be employed to program new behavior using natural language, and also, the ability to debug and examine what happened in the past via a natural language interface as well. This may be used in conjunction with an approach to allow changes to only a portion of a sequence of steps/command without requiring a restart of the entire sequence of steps/commands. FIGS. 13-15 provide an illustrative architecture and related technique(s) for implementing code generation using natural language programming, which may be used in conjunction with certain embodiments of the invention. This approach therefore does not require manual programming to implement a new function or behavior into a computing or processing system.

FIG. 13 provides an illustration of an approach to implement some embodiments of the invention. At (1), a human user 1302 may use a natural language to provide an instruction to a processing device 1304. The processing device 1304 comprises any type of computing or processing device/user station that may be used to implement, operate, or interface with the user 1302 to perform a computing or processing task. Examples of such devices include, for example, personal computers 1306*a*, mobile devices 1306*b*, servers 1306c, or any other type of suitable device such as personal assistants, tablets, smart wearables, nodes, or computing terminals. The processing device 1304 may comprise a display device, such as a display monitor, for displaying a user interface to users at the user station, and a speaker for voice communication with the user. The processing device/user station may also comprise one or more input devices for the user to provide operational control over the activities of the system, such as a microphone to receive voice inputs, or a mouse or keyboard to manipulate a pointing object in a graphical user interface to generate user inputs. The processing device 1304 may be communicatively coupled to a storage apparatus (e.g., a storage subsystem or appliance) over a network. The storage apparatus comprises any storage device that may be employed by the system to hold storage or executable content.

At (2), an attempt is made using software operated by the processing device 1304 to process the user command. At this point, consider if the software operated by the processing device is unable to handle or process the input by the human user. This may occur, for example, because the requested functionality is just completely missing from the logic built into the software. In other words the programmer that wrote the software did not write programming code to implement the desired functionality, perhaps because the programmer did not anticipate that a user would request that functionality.

Another possible reason for the software to fail to process the user input is because of an error or exception that occurs during processing, e.g., where the software is operated with wrong data or a wrong procedure. Both humans and machines will get a bad result if they were given wrong data or a wrong procedure to begin with. However, once a machine gets a bad result, there is generally no easy way for redoing the task with the fixed data or logic. Humans will discover the bad data or logic, then learn what the right data or logic should have been and then redo the portion of the task that needs to be tried again to get to the right result.

Another class of problems that may arise pertains to environmental failures. A human when presented with an environmental failure (say the house loses power, or the internet connection goes down), will pause doing the task they were doing, fix the environmental issue, and then resume the task they were working on originally. The logic for fixing the environmental issue need not be part of the procedure that they were working on. It is injected in an ad hoc manner to handle the unexpected event of the failures in the environment. Computing systems behave differently. If the environment failure was not expected and handled in the given logic in the program being run, the program will simply crash. There is no way for the program to wait and have a human or another program fix the environmental issue allowing the original program to resume.

These stark differences between how machines and humans behave when faced with problems is the fundamental reason why programming is a skill that requires training and only a relatively small fraction of humans have the training or experience to be able to effectively program machines. The programmer is forced to think up-front about all the above classes of errors and either make sure that these errors do not happen or write logic to gracefully handle these errors when and if they happen. It is not a trivial task to make sure that a computer program specify logic in an up-front manner that can handle all unexpected scenarios. This realistically limits the art of good programming to only highly experienced and skilled programmers.

As is evident, one main difference between computers and humans is that in most cases computers have to be instructed up-front what to do, while humans can learn "on-the-job", especially when a problem occurs while performing a task. For example, when performing a task, if a human realizes that some data is missing, the human turns to someone who might have the missing data, and learns the new data and continues doing the task. Computing systems will crash in such a situation unless the developer a priori writes logic to handle the unexpected case. Similarly, when a human is doing a task and realizes that they do not know how to do something, they ask someone who can teach them the skill, they learn and then continue. A computing system may present a compile error and refuse to start doing the task, or worse will crash in the middle of a running task with no recourse to learn on the job.

With embodiments of the invention, the processing device is configured to "learn" how to address the above-described problems, similar to the way that a human would tackle such problems and unlike any existing software paradigm for handling such problems. In particular, the current inventive embodiments provide systems and methods that address the above problem(s) and exhibit human-like error handling in computing systems. Therefore, at (3), the inventive embodiment will search for and learn the appropriate logic and/or data that is needed to address the identified problem that the current software is having with being able to process the user command. Some or all of the following may be addressed: (a) Missing Data; (b) Missing Logic; (c) Wrong Data; (d) Wrong Code; (e) Unexpected Situation; and/or (f) Incomplete code.

The process of learning the solution may cause the system to receive information from any suitable source. For example, at (4), the new logic or data may be received from a human 1308 or any external computing system 1310. The external system may comprise any machine-based source of information, such as a website, knowledgebase, database, or the like.

At (5), the software will learn the new behavior during its current runtime. This means that the software will add the new logic or data while it is still running, and will continue to operate without exiting from or stopping its current execution. At (6), the modified software will then use the new logic/data to perform the originally requested task from the user.

In some embodiment, the system allows for code to change during runtime if the user so prefers. In traditional computer languages, it is not possible to pass a new parameter to a called procedure during runtime because adding a new parameter requires the source code to change in both the calling and called procedure. This makes it hard to build a system that can allow such changes at runtime. However, in some embodiments of the current invention, it is possible for a called procedure to obtain an unforeseen parameter at runtime. This is possible because the calling procedure is not mandated to provide all the parameters when calling the called procedure. The called procedure has the ability to pull parameters on its own accord from the knowledge graph or the user without having to change anything in the calling procedure. This provides tremendous flexibility to change code on the fly. Further, given that the system does not crash but rather asks the user anytime it needs some clarification (like confusion between two items with the same name, like two Johns, or two ways to send, etc), the system further lends itself well to runtime adaptation without having to start from the beginning as many computer systems require.

FIG. 14 provides an illustration of a system architecture 1400 for implementing some embodiments of the invention. The system 1400 includes both a natural language runtime 1406 and a native language runtime 1410. The natural language runtime 1406 performs processing on the basis of natural language processing inputs. The native language runtime 1410 performs processing on the basis of computer code that is written to run "natively" in the system. Native languages are traditional computer programming languages such as, for example, Javascript, Python, Java.

The system 1400 includes a knowledge graph 1412 that can represent facts, procedures and rules. The knowledge graph 1412 is a searchable entity that is capable of being queried to identify entries that are stored within the graph. The knowledge graph 1412 in some embodiments is constructed with the understanding of inheritance and thus, when taught that "a dog is a mammal" and "Tony is a dog", understands that "Tony is a mammal".

In operation, a front end user interface 1404 is employed to receive natural language commands into the natural language runtime 1406. Additional inputs may be received via other applications 1402, such as email or messaging applications. A natural language parser 1408 may be used to parse the natural language inputs received from the front end UI 1404 or the email or messaging applications 1402.

The natural language runtime ("brain") 1406 and the native language runtime 1410 operate in conjunction with one another to process the user commands. For example, as described in more detail below, parameters may be passed through the knowledge graph 1412 between the natural language runtime 1406 and the native language runtime 1410 to execute the user command.

The system 1400 may also include storage 1414 (e.g., a short term memory) where it holds a running context of what is performed in the system, e.g., for tracing purposes. In some embodiments, that context includes all commands run, facts observed, and entities resolved. The context also keeps track of asynchronous tasks that are marked with words like "whenever, while, continuously, after 10 seconds, tomorrow, every week, every alternate day, every second Monday of February", etc. Under the context of each asynchronous task, the system remembers the time stamp of each time it was invoked and the details of each statement run and the result, if any, obtained.

FIG. 15 shows a flowchart of an approach to process natural language according to some embodiments of the invention. The processing generally proceeds by analyzing the words and symbols in a natural language statement. At 1502, the processing receives an abstract syntax tree (AST) that corresponds to the natural language statement. The AST can be generated based on the technique described herein. The natural language text is processed to determine the role of each word and symbol in the statement. This is done in some embodiments by using a neural network trained to do so using any of the common AI-based classification techniques. The AI ('artificial intelligence") models are trained on not only English statements but also statements that include or are completely comprised of mathematical phrases like "1+1", "john's age*2", "the answer", "add 2*log(100) to the bank account". The AI parser outputs the roles of each word and symbol in the statement, which proceeds to the next phase.

The statement with the annotated roles of the words and symbols are processed and converted into the abstract syntax tree that captured the structure of the statements in terms of the traditional grammatical constructs like subject, predicate, object, verb, adjective, adverbs, prepositions, etc. The AST captures the structure of the English (or for that matter any natural language) statement.

One such example of a tree is the traditional 'sentence diagramming' as taught in the English grammar book 'Rex Barks'. However, other equivalent structures can be used. One can use a structure that captures not only the parts of speech, but also the type of sentence as well as the semantic operations required to resolve the concepts in the sentence. For example, "any of the scene's bricks" is translated to:

```
"any",
[ "possessive",
    [ "determinant__name",
      "the",
      "scene",
      null
    ],
    { "members": "bricks" }
],
```

The AST supports different types of natural language statements like declarative, interrogative and imperative/procedural.

Declarative statements usually provide a piece of knowledge that the system represents in a knowledge graph of concepts. Each concept can have inbound and outbound relations to other concepts. The relations between the concepts in the knowledge graph can be "is a", "is name of", "corresponds to", or any regular relation typically encountered in natural language ("brother of", "car of", etc.) or in relational databases. The concepts can optionally have a value ("john's age is 21"). Declarative statements update the knowledge graph using relations between concepts and values stored within concepts. Some declarative statements define how to compute things. For example, "a number's square root is . . . " is the start of a declarative statement that defines how to find out the square root of any number. Such statements create conceptual nodes in the knowledge graph that are referred to when those kinds of entities need to be evaluated. Note that the procedure to evaluate an entity can be given in either English ("a number is odd if the number is not even") or in a standard computer language like javascript. Some declarative statements define how to do things, for example, "to send a message to a person . . . ". This statement is the start of a procedure that defines how to send a message to a person. This is stored in a conceptual node in the knowledge graph and invoked when a concept action like "send 'hello' to John" is called, where the system knows that 'hello' is a message and John is a person.

Interrogative statements essentially traverse the knowledge graph that was created as a result of declarative statements and present the answer to the user.

Imperative statements execute actions and are processed to find out the verb and the associated objects, prepositions, adjectives, etc. Then, all the known procedures that match the classes of the concepts are examined to find the best match. That matched procedure is then executed with the given concrete concepts. For example, "a friend is a person. John is a friend. send the shop's summary to John" resolves into the verb "send" that acts on "the shop's summary" which is of the class 'string' and the prepositional object is John who is of the class friend, which in turn is of the class person. All known procedures that agree with the class of the concepts in the imperative statement are examined and the closest match is executed. If there is a confusion as to which one to run, the user is given the choice to pick the one to run. A procedure in turn can be a collection of statements which are processed sequentially according to the method described above. The collection of statements could also be in a native computer language, in which case the set of statements are run using a standard interpreter for those languages.

At 1504, nouns within the AST are resolved to the knowledge graph. For example, the nouns within the AST can be resolved to its corresponding concept within the knowledge graph and/or trace. At 1506, actions within the AST are resolved to the knowledge graph. For example, each action in a structured sentence within the AST can be resolved to its corresponding procedure within the knowledge graph.

There is the notion of environments that is key to the selection of both data from the knowledge graph as well as procedures from the knowledge graph. For example, the system can be programmed to do the same task in different ways in different environments. Environments can be temporal or spatial. For example, "while in India, to order lunch . . . " versus "while in America, to order lunch . . . ". Here, 'while in India/America' is the environment. In both environments, the same procedure "to order lunch" has been defined. The system can be informed that it is in an environment via a simple statement like 'you are in India". That allows the system from then on until it exits the environment, to choose both facts and procedures that are relevant to the environment.

At 1508, the processing will thereafter run the procedures that correspond to the actions. At 1510, recording is performed of information pertaining to the execution of the procedures. For example, the system may record the natural language statement, the AST, and the resolved concepts and procedures as the statement's trace.

With regards to procedures, it is noted that the procedures can be defined with a natural language name or header. In some embodiments, there are no function names or formal arguments as in traditional computer languages. The body of the procedure can itself be in natural language or can be in any of the traditional computer languages.

Further details regarding an approach to implement natural language programming is described in co-pending U.S. patent application Ser. No. 17/452,047, which is hereby incorporated by reference in its entirety.

Therefore, what has been described is an improved approach to implement software programming which allows for interactive coding without having to restart a procedure. This is implemented in some embodiments with the combination of an interpreter which allows for modification of code during runtime using an interactive console and a versioned memory system used by the interpreter to rollback memory to a previous state of execution.

System Architecture Overview

Figure 16:
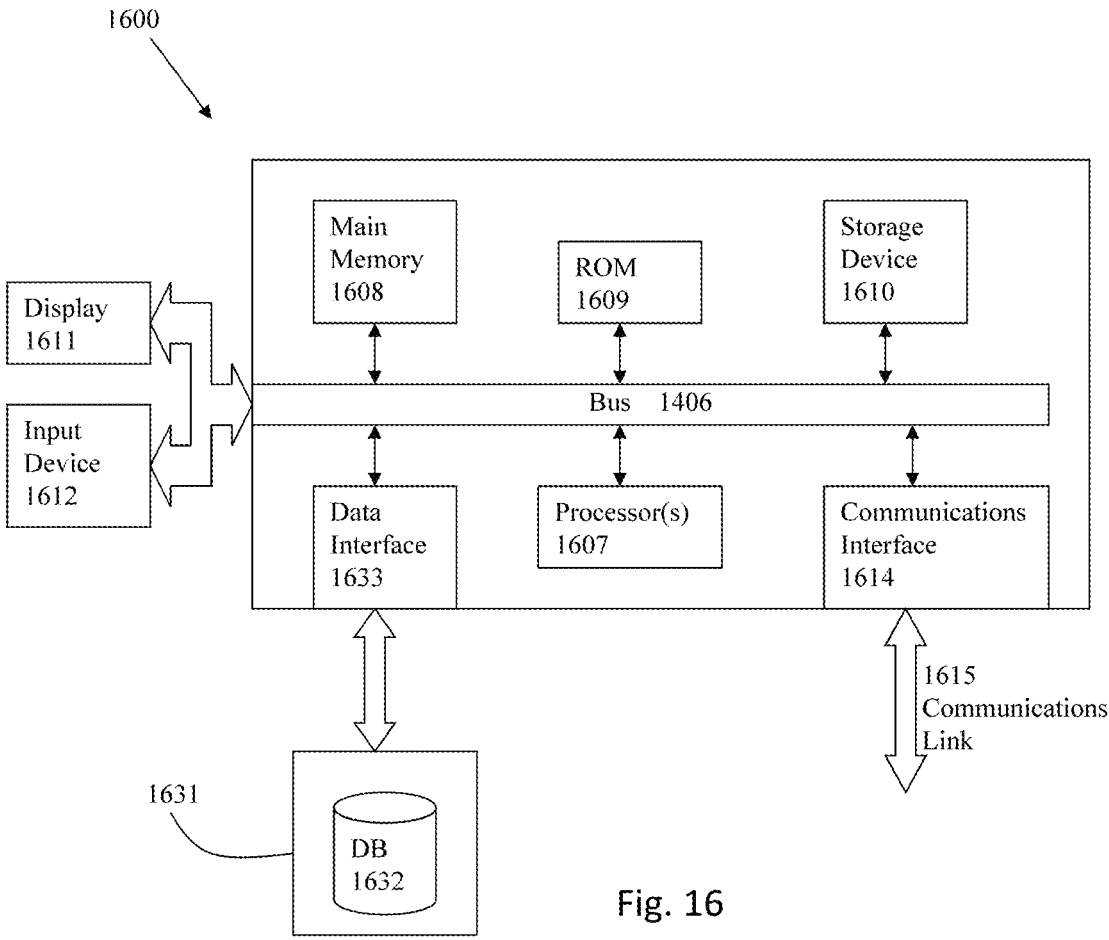
FIG. 16 is a block diagram of an illustrative computing system suitable for implementing an embodiment of the present invention.

FIG. 16 is a block diagram of an illustrative computing system 1600 suitable for implementing an embodiment of the present invention. Computer system 1600 includes a bus 1606 or other communication mechanism for communicating information, which interconnects subsystems and devices, such as processor 1607, system memory 1608 (e.g., RAM), static storage device 1609 (e.g., ROM), disk drive 1610 (e.g., magnetic or optical), communication interface 1614 (e.g., modem or Ethernet card), display 1611 (e.g., CRT or LCD), input device 1612 (e.g., keyboard), and cursor control.

According to one embodiment of the invention, computer system 1600 performs specific operations by processor 1607 executing one or more sequences of one or more instructions contained in system memory 1608. Such instructions may be read into system memory 1608 from another computer readable/usable medium, such as static storage device 1609 or disk drive 1610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1607 for execution. Such a medium may take many forms, including but not limited to, non-volatile media and volatile media. Non-volatile media includes, for example, optical or magnetic disks, such as disk drive 1610. Volatile media includes dynamic memory, such as system memory 1608. A database 1632 may be accessed in a computer readable medium 1631 using a data interface 1633.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1600. According to other embodiments of the invention, two or more computer systems 1600 coupled by communication link 1615 (e.g., LAN, PTSN, or wireless network) may perform the sequence of instructions required to practice the invention in coordination with one another.

Computer system 1600 may transmit and receive messages, data, and instructions, including program, i.e., application code, through communication link 1615 and communication interface 1614. Received program code may be executed by processor 1607 as it is received, and/or stored in disk drive 1610, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

13

14

What is claimed is:

1. A method, comprising:

running a sequence of steps for a procedure within a software program, wherein running the sequence of steps creates a set of data in computer memory;

displaying the sequence of steps within a user interface and receiving an instruction from a user to undo a step from the sequence of steps;

undoing the step within the sequence of steps, wherein a natural language interpreter ignores a version of a value created by the step that was undone; and generating a result from the procedure within the software program without restarting the sequence of steps, wherein the procedure continues executing steps forward from a location in the sequence of step from which the step was undone.

2. The method of claim 1, wherein the computer memory is implemented as a versioned memory system, and the versioned memory system comprises a vertex chain corresponding to a list having a temporal order for a name and a corresponding value for the name.

3. The method of claim 2, wherein the vertex chain maintains a historical record of values for a given name.

4. The method of claim 2, wherein a context and a specific step are maintained for a value.

5. The method of claim 4, wherein the value is scratched if a corresponding step is undone.

6. The method of claim 1, wherein the computer memory is rolled back to a previous state of execution.

7. The method of claim 1, wherein a user interface is provided that identifies one or more commands that have been executed which are selectable to be undone, and where selection of a command to be undone causes a version of a value for the command to be ignored.

8. The method of claim 1, wherein the software program corresponds to a natural language program.

9. A non-transitory computer program product embodied on a computer readable medium, the computer readable medium having stored thereon a sequence of instructions which, when executed by a processor, performs:

running a sequence of steps for a procedure within a software program, wherein running the sequence of steps creates a set of data in computer memory;

displaying the sequence of steps within a user interface and receiving an instruction from a user to undo a step from the sequence of steps;

undoing the step within the sequence of steps, wherein a natural language interpreter ignores a version of a value created by the step that was undone; and generating a result from the procedure within the software program without restarting the sequence of steps, wherein the procedure continues executing steps forward from a location in the sequence of step from which the step was undone.

10. The computer program product of claim 9, wherein the computer memory is implemented as a versioned memory system, and the versioned memory system comprises a vertex chain corresponding to a list having a temporal order for a name and a corresponding value for the name.

11. The computer program product of claim 10, wherein the vertex chain maintains a historical record of values for a given name.

12. The computer program product of claim 10, wherein a context and a specific step are maintained for a value.

13. The computer program product of claim 12, wherein the value is scratched if a corresponding step is undone.

14. The computer program product of claim 9, wherein the computer memory is rolled back to a previous state of execution.

15. The computer program product of claim 9, wherein a user interface is provided that identifies one or more commands that have been executed which are selectable to be undone, and where selection of a command to be undone causes a version of a value for the command to be ignored.

16. The computer program product of claim 9, wherein the software program corresponds to a natural language program.

17. A system, comprising:

a processor;

a memory for holding programmable code; and wherein the programmable code includes instructions for:

running a sequence of steps for a procedure within a software program, wherein running the sequence of steps creates a set of data in computer memory; displaying the sequence of steps within a user interface and receiving an instruction from a user to undo a step from the sequence of steps; undoing the step within the sequence of steps, wherein a natural language interpreter ignores a version of a value created by the step that was undone; and generating a result from the procedure within the software program without restarting the sequence of steps, wherein the procedure continues executing steps forward from a location in the sequence of step from which the step was undone.

18. The system of claim 17, wherein the computer memory is implemented as a versioned memory system, and the versioned memory system comprises a vertex chain corresponding to a list having a temporal order for a name and a corresponding value for the name.

19. The system of claim 18, wherein the vertex chain maintains a historical record of values for a given name.

20. The system of claim 18, wherein a context and a specific step are maintained for a value.

21. The system of claim 20, wherein the value is scratched if a corresponding step is undone.

22. The system of claim 17, wherein the computer memory is rolled back to a previous state of execution.

23. The system of claim 17, wherein a user interface is provided that identifies one or more commands that have been executed which are selectable to be undone, and where selection of a command to be undone causes a version of a value for the command to be ignored.

24. The system of claim 17, wherein the software program corresponds to a natural language program.

* * * * *